L. K. SNELL.
MOTOR VEHICLE.
APPLICATION FILED NOV. 26, 1915.
1,358,890. Patented Nov. 16, 1920.
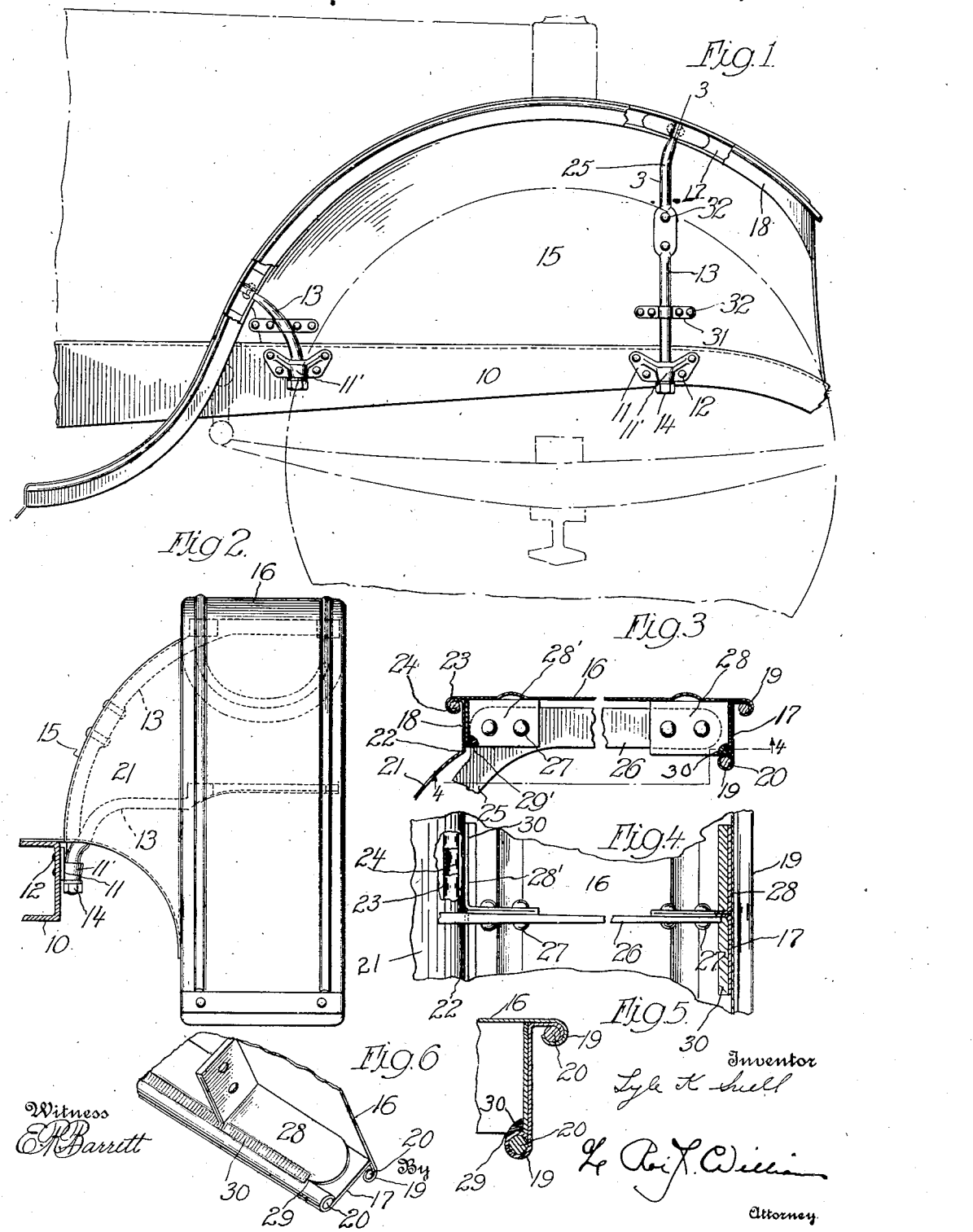

UNITED STATES PATENT OFFICE.

LYLE K. SNELL, OF DETROIT, MICHIGAN, ASSIGNOR TO CADILLAC MOTOR CAR COMPANY, OF DETROIT, MICHIGAN, A CORPORATION OF MICHIGAN.

MOTOR-VEHICLE.

1,358,890.      Specification of Letters Patent.      Patented Nov. 16, 1920.

Application filed November 26, 1915. Serial No. 63,427.

*To all whom it may concern:*

Be it known that I, LYLE K. SNELL, a citizen of the United States, and resident of Detroit, Wayne county, State of Michigan, have invented certain new and useful Improvements in Motor-Vehicles, of which the following is a specification.

This invention relates to motor vehicles and particularly to the construction and supporting of fenders therefor.

One of the objects of this invention is to provide a simple and efficient means for supporting fenders without defacing or distorting the surface of the sheet metal.

Another object of this invention is to provide means for adequately securing supports or brackets to sheet metal fenders, whereby additional reinforcement will be obtained and the several parts joined where they will be least affected by vibrations or rust and be entirely concealed.

These and other objects will appear from the following description, taken in connection with the accompanying drawings, which form a part of this specification, and in which, Figure 1 is a side elevation, with parts broken away, of a fender of a motor vehicle, embodying, in its support, a preferred form of my invention;

Fig. 2 is a rear elevation of the fender and associated parts shown in Fig. 1;

Fig. 3 is a transverse vertical section substantially on the line 3—3 of Fig. 1;

Fig. 4 is a bottom view of the parts shown in Fig. 3;

Fig. 5 is an enlarged transverse vertical section of a portion of a fender, showing a preferred means of attaching a bracket thereto; and Fig. 6 is a perspective fragmentary view of a fender, showing a supporting plate and its method and means of attachment to the fender.

Referring to the drawings, 10 represents a frame side member of a motor vehicle, to which may be secured brackets 11, as by rivets 12. Fender irons 13 may be suitably mounted in bosses 11', formed in the brackets 11, and are secured in position as by nuts 14. A sheet metal fender 15 may be held in position by supporting irons 13, and attaching means which will now be more particularly described.

The member 15, which may be a steel stamping, is provided with a top face portion 16 and downwardly extending side face portions 17 and 18. The part 17 is lipped or turned over at its upper and lower edges, forming beads or reinforcing ribs 19, in each of which may be arranged a strengthening wire or rod 20. The other side face 18 has a struck up apron 21, thus forming an angular surface for this side of the fender, and, of course, in striking up the apron, a rib 22 is formed where the downwardly extending portion 18 and the apron 21 meet. This side face is also provided at its upper edge with a bead 23 similar to the bead 19 in the face 17, and has a similar strengthening wire or rod 24 arranged therein.

Supporting members or angle plates 28 and 28' are secured to the downwardly extending side face portions 17 and 18 of the fender by a fusing of metal as acetylene welding; the plates 28 and 28' having one section at right angles to the top face portion 16 of the fender and the other section extending along the side face portions 16 and 17 with the lower edges of said angle plates immediately above the lower reinforcing ribs 19 and 22 where the metal is fused or welded to form a solid and permanent connection between the plates and the fender as shown at 30 Fig. 6.

It must be here noted that the welding will materially strengthen the joint where the most rigidity is needed and making the weld at this particular place does not distort or bulge the metal as would likely occur if the same operation was done on a flat part of the fender.

The fender irons 13 comprise a shank 25, and a bracket portion 26, adjacent each end of which the supporting members or plates 28 and 28' are secured as by rivets, whereby the brackets with the plates secured thereto form an angle reinforcement extending transversely of the fender face in such a manner that loosening or dislodgment is prevented and a construction completed which will require a severe collision to bend or distort the same. This is a most advantageous feature with motor vehicle fenders and particularly when such advantages are obtained without excessive work or expense.

While the construction as heretofore described is sufficient to maintain the fender in proper position, the irons 13 may be connected, as by cleats 31 and rivets 32, located at inconspicuous or concealed positions on the fender 15.

Of course it will be understood that by placing a brace, in the form of the supporting portion 26 of the fender iron 13 between the plates 28 and 28', which are welded to the faces 17 and 18 respectively, all tendency to break the welded joint by twisting of the plates relative to their adjacent faces, is minimized and thus, the entire structure is considerably strengthened.

While I have described and illustrated a preferred emodiment of my invention, it will be understood that various modifications and modes of securing metallic members together and strengthening their securing means, may be made without departing from the spirit and scope of this invention.

Having thus described my invention, what I claim and desire to secure by Letters Patent is:—

1. In combination in a fender for a motor vehicle, a sheet metal top portion; two side flanges extending downwardly from said top portion and each of which is provided with strengthening means adjacent its free edge; two supporting members arranged edgewise relative to said top portion and which supporting members are secured to said downwardly extending flanges by fusion of metal between the lower edges of said fastening means and the strengthening means at the lower edges of said flanges; and a supporting member secured to said fastening means and whereby the fender is supported.

2. In combination in a fender for vehicle wheels, a sheet metal top portion; two side flanges extending downwardly from said top portion and each of which is provided with a strengthening member at its lower edge; two supporting plates right angular in form and arranged edgewise relative to said top portion and having each a face portion disposed adjacent a side flange and which portions are secured by a fusion of metal to the strengthening means at the lower edges of said side flanges, and having also each a transversely extending portion; and a supporting member whereby the fender is supported, and which supporting member is secured to the transversely extending portions of said supporting plates.

3. In combination in a fender for a vehicle wheel, a sheet metal top portion; two side flanges extending downwardly from said top portion; supporting means arranged edgewise relative to said top portion and which supporting means is secured at its two ends to the downwardly extending flanges aforesaid of said top portion; and a supporting member, the upper end of which is connected with said supporting means and which supporting member serves to support the fender.

4. In combination in a fender for a vehicle wheel, a sheet metal top portion having side flanges extending downwardly from said top portion and spaced apart from one another, and the lower edges of which side portions are provided with strengthening means; fastening means arranged between said side flanges and edgewise relative to said top portion, and the end portions of which fastening means are secured by a fusion of metal to said side flanges adjacent the strengthening means aforesaid; and a supporting member secured to said fastening means and through which the fender is supported.

5. In combination in a fender for motor vehicle wheels, a sheet metal top portion having two side flanges extending downwardly therefrom and spaced apart from one another; two supporting plates arranged edgewise relative to said top portion and which supporting plates are right angular in form, one face of each of said plates extending alongside of and being secured to one of said side flanges along its lower edge; and a supporting member secured to the other faces of said supporting plates and through which member the fender is supported.

6. In combination in a fender for a vehicle wheel, a sheet metal top portion; a downwardly extending side flange; a supporting plate arranged edgewise relative to said top portion and the lower edge of which plate is secured by a fusion of metal to the lower edge of said flange; and a supporting member one end of which is connected with said supporting plate and through which member the fender is supported.

7. In combination in a fender for a vehicle wheel, a sheet metal top portion; a side flange extending downwardly from said top portion and which side flange is provided with strengthening means adjacent its lower edge; a supporting plate right angular in form and arranged edgewise relative to said top portion, and one portion of which supporting plate extends alongside of and is secured to said side flange adjacent the strengthening means aforesaid by a fusion of metal between said lower edge and said side flange, and the other portion of which supporting plate extends transverse to said top portion; and a supporting member connected with the transverse portion of said supporting plate and whereby the fender is supported.

8. The combination with a sheet metal fender, comprising a top portion and a downwardly extending portion, said downwardly extending portion being struck up intermediate its edges, forming an angle, and a supporting plate arranged edgewise relative to said top portion and connected to said downwardly extending portion by a fusion of metals adjacent the angle only.

9. The combination with a sheet metal fender, comprising a top portion and a pair of downwardly extending side portions, one of which is formed with a bead, the other of which has a struck up portion, thereby forming an angle, and two flat supporting members adapted to be connected to said fender by a fusion of the members adjacent the bead on one of said downwardly extending portions, and the angle of the other respectively and a supporting member connected with both said plates.

10. The combination with a sheet metal fender comprising a top portion, and a pair of downwardly extending side portions, each of which is provided with a strengthened portion adjacent its lower edge, two supporting members secured one to each of said downwardly extending portions by a fusion of metal adjacent said strengthened portion only, and which strengthening plates are arranged edgewise relative to said top portion, and means for connecting said members together.

11. The combination with a sheet metal fender having two oppositely arranged faces, each of which is provided with a strengthened portion, a pair of plates each comprising a face portion and a transversely arranged portion, each plate being adapted to have its face portion secured to a face of said fender by a fusion of metal adjacent said strengthened portion only, and means for connecting said transversely arranged portions together.

12. The combination with a sheet metal fender having a top portion, and two oppositely arranged downwardly extending flanges, each of which is provided with a strengthened portion, a pair of angle iron plates comprising a face portion and a transversely arranged portion, each plate being adapted to have its face portion secured to a flange by a fusion of metal adjacent said strengthened portion only, and means comprising a fender iron for connecting said transversely arranged portions together.

In testimony whereof I affix my signature in the presence of two witnesses.

LYLE K. SNELL.

Witnesses:
DANIEL T. SMITH,
F. L. DAVIS.